US011150338B2

(12) United States Patent
Kurono et al.

(10) Patent No.: US 11,150,338 B2
(45) Date of Patent: Oct. 19, 2021

(54) AZIMUTH CALCULATION DEVICE AND AZIMUTH CALCULATION METHOD

(71) Applicant: DENSO TEN Limited, Kobe (JP)

(72) Inventors: Yasuhiro Kurono, Kobe (JP); Hiroki Ishikawa, Kobe (JP)

(73) Assignee: DENSO TEN Limited, Kobe (JP)

(*) Notice: Subject to any disclaimer, the term of this patent is extended or adjusted under 35 U.S.C. 154(b) by 270 days.

(21) Appl. No.: 16/361,625

(22) Filed: Mar. 22, 2019

(65) Prior Publication Data

US 2019/0353771 A1  Nov. 21, 2019

(30) Foreign Application Priority Data

May 15, 2018 (JP) .............................. JP2018-093752

(51) Int. Cl.
*G01S 13/68* (2006.01)
*G01S 13/931* (2020.01)

(52) U.S. Cl.
CPC ............. *G01S 13/68* (2013.01); *G01S 13/931* (2013.01); *G01S 2013/93271* (2020.01)

(58) Field of Classification Search
CPC .................................. G01S 7/403; G01S 7/356
See application file for complete search history.

(56) References Cited

U.S. PATENT DOCUMENTS

| | | | |
|---|---|---|---|
| 5,134,411 A * | 7/1992 | Adler | G01S 7/354 342/130 |
| 6,008,759 A * | 12/1999 | Tangemann | G01S 3/28 342/368 |
| 6,351,238 B1 * | 2/2002 | Kishigami | G01S 3/74 342/417 |
| 6,567,034 B1 * | 5/2003 | Yu | G01S 3/74 342/149 |
| 10,274,579 B2 * | 4/2019 | Pellegrini | G01S 3/48 |

(Continued)

FOREIGN PATENT DOCUMENTS

EP 2662699 A1 * 11/2013 ............... G01S 3/74
JP 2015-014593 A 1/2015

OTHER PUBLICATIONS

N. Le Bihan et al, "MUSIC Algorithm for Vector-Sensors Array Using Biquaternions"; IEEE Transactions on Signal Processing; vol. 55, No. 9; Sep. 2007; pp. 4523-4533; published by IEEE, Piscataway, NJ, USA. (Year: 2007).*

*Primary Examiner* — Bernarr E Gregory
(74) *Attorney, Agent, or Firm* — Oliff PLC

(57) ABSTRACT

An azimuth calculation device includes: an acquiring unit configured to acquire signals of plural receiving antennas of an antenna group in which the plural receiving antennas are arranged in each of a first axis direction and a second axis direction, based on reception signals received by the antenna group; a first azimuth calculation unit configured to perform a calculation of a direction of arrival of radio wave in the first axis direction based on the signals of the plural receiving antennas acquired; a vector decomposition unit configured to perform vector decomposition with respect to each of antenna arrangement positions in the second axis direction using a result of the calculation by the first azimuth calculation unit; and a second azimuth calculation unit configured to perform a calculation of a direction of arrival of radio wave in the second axis direction, using a result of the vector decomposition.

8 Claims, 8 Drawing Sheets

(56) References Cited

U.S. PATENT DOCUMENTS

| | | | |
|---|---|---|---|
| 2004/0189525 A1* | 9/2004 | Beadle | G01S 3/14 |
| | | | 342/451 |
| 2006/0087475 A1* | 4/2006 | Struckman | G01S 5/04 |
| | | | 342/451 |
| 2006/0208947 A1* | 9/2006 | Tsuchihashi | G01S 3/74 |
| | | | 342/417 |
| 2008/0001821 A1* | 1/2008 | Tanaka | G01S 3/74 |
| | | | 342/417 |
| 2008/0231505 A1* | 9/2008 | Zhu | G01S 3/74 |
| | | | 342/350 |
| 2012/0194379 A1* | 8/2012 | Kurono | G01S 13/345 |
| | | | 342/147 |

\* cited by examiner

|  | HORIZONTAL ANGLE θ1 | HORIZONTAL ANGLE θ2 | HORIZONTAL ANGLE θ3 |
|---|---|---|---|
| RECEIVING ANTENNAS 32_9 TO 32_12 | Y13 | Y23 | Y33 |
| RECEIVING ANTENNAS 32_5 TO 32_8 | Y12 | Y22 | Y32 |
| RECEIVING ANTENNAS 32_1 TO 32_4 | Y11 | Y21 | Y31 |

AZIMUTH CALCULATION DEVICE AND AZIMUTH CALCULATION METHOD

CROSS-REFERENCE TO RELATED APPLICATIONS

This application is based upon and claims the benefit of priority from prior Japanese patent application No. 2018-093752, filed on May 15, 2018, the entire contents of which are incorporated herein by reference.

TECHNICAL FIELD

The present invention relates to an azimuth calculation device and an azimuth calculation method for calculating the direction of arrival of radar waves.

RELATED ART

A radar device having plural receiving antennas arranged two-dimensionally along the vertical direction and the horizontal direction so as to be able to calculate the direction of arrival of each radar wave (the reflected wave from each object) on the basis of both of the angle in the horizontal direction and the angle in the vertical direction has been proposed (see Paragraph No. 0007 of JP-A-2015-014593 for instance).

SUMMARY

As a method of calculating both of the angle in the horizontal direction and the angle in the vertical direction, there is a method of performing a two-dimensional FFT (Fast Fourier Transform) process on beat signals generated on the basis of the reception signals of the individual antennas.

However, in the case of performing the two-dimensional FFT process on the beat signals, since the signals to be subjected to the second FFT process should have phase information, there is a problem that the azimuth calculation algorithm is limited to DBF (Digital Beam Forming).

Aspect of non-limiting embodiments of the present disclosure relates to provide an azimuth calculation device and an azimuth calculation method having a high degree of freedom for azimuth calculation algorithms.

According to an aspect of the present disclosure, there is provided an azimuth calculation device including: an acquiring unit configured to acquire signals of plural receiving antennas of an antenna group in which the plural receiving antennas are arranged in each of a first axis direction and a second axis direction, based on reception signals received by the antenna group; a first azimuth calculation unit configured to perform a calculation of a direction of arrival of radio wave in the first axis direction based on the signals of the plural receiving antennas acquired by the acquiring unit; a vector decomposition unit configured to perform vector decomposition with respect to each of antenna arrangement positions in the second axis direction using a result of the calculation by the first azimuth calculation unit, the antenna arrangement positions being positions at which the plural receiving antennas of the antenna group are arranged; and a second azimuth calculation unit configured to perform a calculation of a direction of arrival of radio wave in the second axis direction, using a result of the vector decomposition by the vector decomposition unit.

In the azimuth calculation device, the vector decomposition unit may set a mode vector reference for each of the antenna arrangement positions in the second axis direction.

In the azimuth calculation device, the vector decomposition unit may set, as the mode vector reference, an antenna arrangement position of a predetermined antenna of the antenna group in the first axis direction.

In the azimuth calculation device, one of the first axis direction and the second axis direction is a horizontal direction, and other of the first axis direction and the second axis direction is a vertical direction, and aperture lengths of the plural receiving antennas in the vertical direction may be larger than aperture lengths of the plural receiving antennas in the horizontal direction.

The azimuth calculation device may further include a determining unit, the first axis direction and the second axis direction may be the same direction, and the determining unit may determine an azimuth to be used, from azimuth candidates including the result of the calculation by the first azimuth calculation unit and replication of phase of the result of the calculation by the first azimuth calculation unit, based on the result of the calculation by the second azimuth calculation unit.

According to another aspect of the present disclosure, there is provided an azimuth calculation method including: acquiring signals of plural receiving antennas of an antenna group in which the plural receiving antennas are arranged in each of a first axis direction and a second axis direction, based on reception signals received by the antenna group; calculating a direction of arrival of radio wave in the first axis direction based on the signals of the plural receiving antennas acquired; performing vector decomposition with respect to each of antenna arrangement positions in the second axis direction using a result of the calculating of the direction of arrival of radio wave in the first axis direction, the antenna arrangement positions being positions at which the plural receiving antennas of the antenna group are arranged; and calculating a direction of arrival of radio wave in the second axis direction, using a result of the vector decomposition.

According to the azimuth calculation device and the azimuth calculation method, the degree of freedom for azimuth calculation algorithms may be improved.

BRIEF DESCRIPTION OF DRAWINGS

Exemplary embodiment(s) of the present invention will be described in detail based on the following figures, wherein.

DETAILED DESCRIPTION

Hereinafter, exemplary embodiments of the present invention will be described in detail with reference to the drawings.

1. First Embodiment

<1-1. Configuration of Radar Device>

Figure 1:
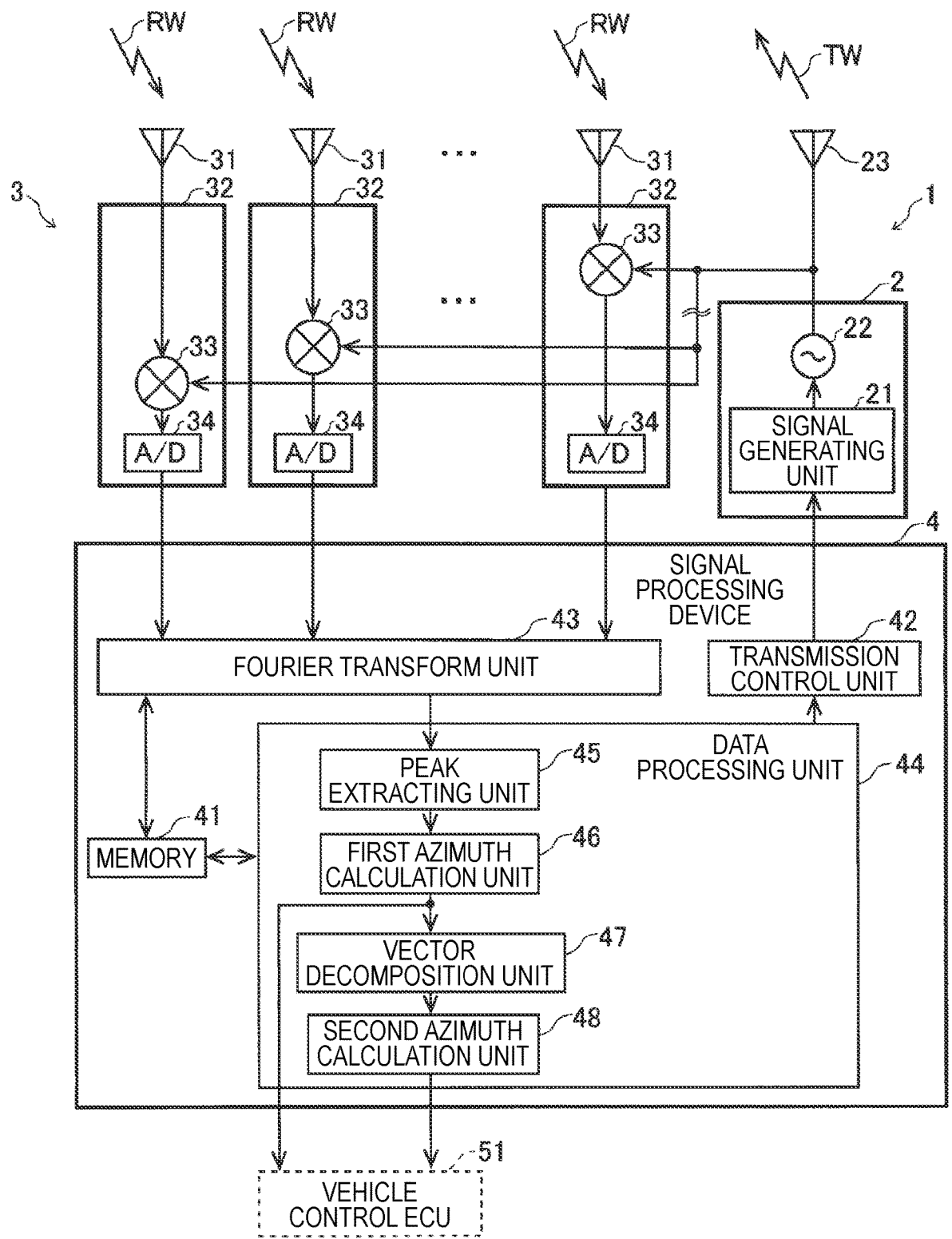
FIG. 1 is a view illustrating an example of the configuration of a radar device according to a first embodiment.

FIG. 1 is a view illustrating the configuration of a radar device 1 according to the first embodiment. The radar device 1 is mounted on a vehicle such as an automobile. In the case where the radar device 1 is mounted on the front end of an automobile, the radar device 1 acquires target data items on targets existing in front of the automobile, using a transmission wave. The target data items include the distances to the targets, the relative velocities of the targets with respect to the radar device 1, and so on. However, since the radar device 1 according to the present embodiment will be described as an example of an azimuth calculation device, hereinafter, only parts related to azimuth calculation will be described.

As shown in FIG. 1, the radar device 1 mainly includes a transmitting unit 2, a receiving unit 3, and a signal processing device 4.

The transmitting unit 2 includes a signal generating unit 21 and an oscillator 22. The oscillator 22 generates a transmission signal by modulating a signal generated in the signal generating unit 21. A transmitting antenna 23 converts the transmission signal into a transmission wave TW, and outputs the transmission wave.

The receiving unit 3 includes plural receiving antennas 31, and plural individual receiving units 32 connected to the plural receiving antennas 31. The plural receiving antennas 31 form an antenna group in which plural receiving antennas are arranged in each of the horizontal direction and the vertical direction. The receiving antennas 31 acquire reception signals by receiving reflected waves RW from targets, and the individual receiving units 32 acquire the reception signals from the receiving antennas 31, respectively, and process them.

Figure 2:
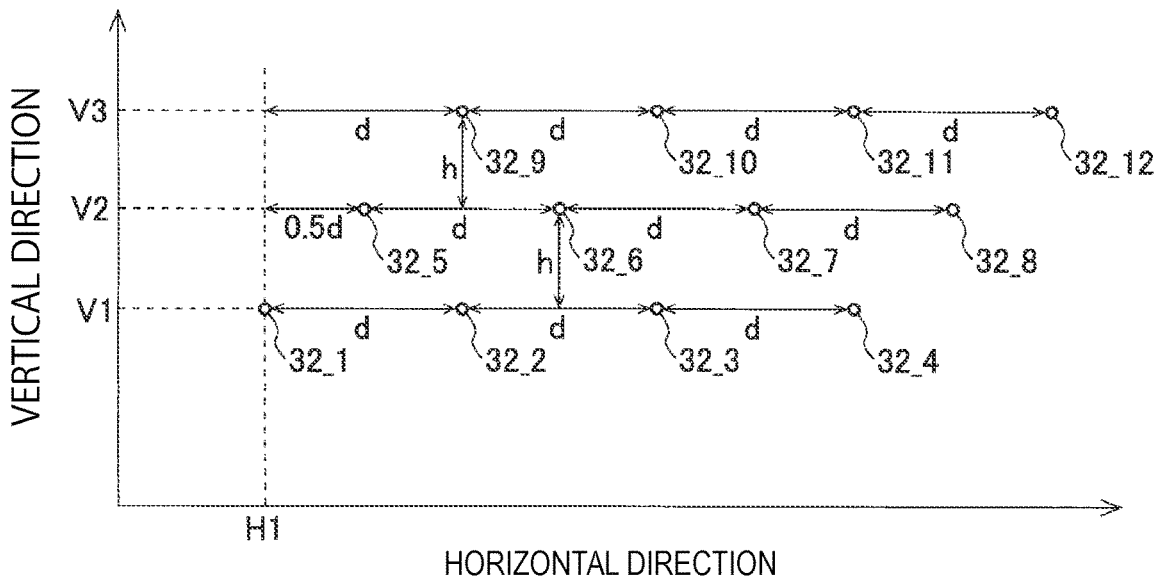
FIG. 2 is a view illustrating the antenna arrangement of an antenna group according to the first embodiment.

In the present embodiment, the plural receiving antennas 31 are twelve receiving antennas 31_1 to 31_12, and form an antenna group having an antenna arrangement shown in FIG. 2. In the antenna group shown in FIG. 2, the horizontal distance between receiving antennas adjacent to each other in the horizontal direction is d meters, and the vertical distance between receiving antennas adjacent to each other in the vertical direction is h meters. Also, the receiving antenna 31_5 is shifted from the receiving antenna 31_1 to one side in the horizontal direction by 0.5 d meters, and the receiving antenna 31_9 is shifted from the receiving antenna 31_1 to one side in the horizontal direction by d meters.

Referring to FIG. 1 again, each individual receiving unit 32 includes a mixer 33 and an A/D converter 34. The reception signals acquired by the receiving antennas 31 are amplified in low-noise amplifiers (not shown in the drawings), and are transmitted to the mixers 33. The mixers 33 receives the transmission signal from the oscillator 22 of the transmitting unit 2, and mix the transmission signal and the reception signals. In this way, beat signals having beat frequencies which are the differences between the frequency of the transmission signal and the frequencies of the reception signals are generated. The beat signals generated in the mixers 33 are converted into digital signals in the A/D converters 34, and are output to the signal processing device 4.

In the case where the radar device 1 is an FM-CW (Frequency-Modulated Continuous-Wave) type radar device, since the frequency differences between the transmission wave TW and reception waves RW are directly proportional to the distances between the corresponding targets and the radar device, the frequency differences become distance variation components. Meanwhile, in the case where the radar device 1 is an FCM (First Chirp Modulation) type radar device, since the phase differences between the transmission wave TW and reception waves RW are directly proportional to the distances between the corresponding targets and the radar device, variation components of beat signals attributable to the phase differences become distance variation components. Also, since the reception waves RW of targets depend on the velocities of the targets during reflection from the targets, and the frequency differences between the transmission wave and the reception waves RW of targets are directly proportional to the relative velocities between the targets and the radar device (the Doppler frequencies), the variation components of the beat signals based on the frequency differences between the pulses becomes velocity variation components. Also, in the case where there are plural targets having different relative velocities and different distances, since plural reflected waves having different phase shift amounts and different Doppler shift amounts are input to each receiving antenna 31, the beat signal acquired in each mixer 33 includes various components corresponding to the individual targets.

The signal processing device 4 includes a microcomputer including a CPU (Central Processing Unit), a memory 41, and so on. The signal processing device 4 stores various data to be used in calculation, in the memory 41 which is a storage device. The memory 41 is, for example, a RAM (Random Access Memory) or the like. The signal processing device 4 has a transmission control unit 42, a Fourier transform unit 43, and a data processing unit 44, as functions which are realized in a software wise in the microcomputer. The transmission control unit 42 controls the signal generating unit 21 of the transmitting unit 2. The data processing unit 44 includes a peak extracting unit 45, a first azimuth calculation unit 46, a vector decomposition unit 47, and a second azimuth calculation unit 48.

The Fourier transform unit 43 horizontally performs Fourier transform on the beat signals generated on the basis of the reception signals. As an example of the Fourier transform, FFT (Fast Fourier Transform) may be taken. By the Fourier transform, the reception levels and the phase information items are calculated with respect to frequency points (also referred to as frequency bins) set at intervals of a predetermined frequency.

The peak extracting unit 45 detects peaks from the results of the Fourier transform of the Fourier transform unit 43.

The first azimuth calculation unit 46 calculates the horizontal directions of arrival of the radar waves (horizontal angles) on the basis of the signals corresponding to the frequency bins at which the peaks have occurred, and outputs the horizontal angles as the azimuth calculation results to the vector decomposition unit 47, the memory 41, a vehicle control ECU 51, and so on.

The vector decomposition unit 47 performs vector decomposition with respect to each of vertical antenna arrangement positions V1 to V3 of the antenna group shown in FIG. 2, using the horizontal angles which are the results of the azimuth calculation of the first azimuth calculation unit 46.

The second azimuth calculation unit 48 calculates the vertical directions of arrival of the radar waves (vertical angles), using the results of the vector decomposition of the vector decomposition unit 47, and outputs the vertical angles as the azimuth calculation results to the memory 41, the vehicle control ECU 51, and so on.

<1-2. Operation of Signal Processing Device>

Figure 3:
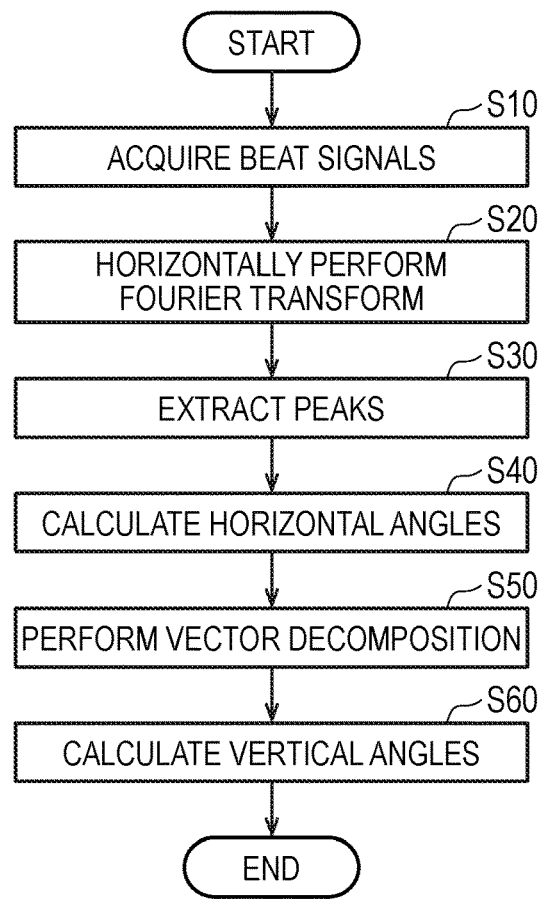
FIG. 3 is a flow chart illustrating an operation of a signal processing device according to the first embodiment.

Now, the operation of the signal processing device 4 according to the present embodiment will be described. FIG. 3 is a flow chart illustrating the operation of the signal processing device 4. The signal processing device 4 periodically repeats the process shown in FIG. 3 at intervals of a predetermined time.

The signal processing device 4 acquires a predetermined number of beat signals (STEP S10). Next, the Fourier transform unit 43 horizontally performs first Fourier transform on the beat signals corresponding to the receiving antennas 32_1 to 32_4 (STEP S20). Similarly, the Fourier transform unit 43 horizontally performs second Fourier transform on the beat signals corresponding to the receiving antennas 32_5 to 32_8 (STEP S20), and horizontally performs third Fourier transform on the beat signals corresponding to the receiving antennas 32_9 to 32_12 (STEP S20).

Next, the peak extracting unit 45 extracts peaks from the results of the first Fourier transform to the third Fourier transform (STEP S30).

Next, the first azimuth calculation unit 46 calculates a maximum of three horizontal angles based on the peaks extracted from the results of the first Fourier transform, by an azimuth calculation process (STEP S40). Similarly, by the azimuth calculation process, the first azimuth calculation unit 46 calculates a maximum of three horizontal angles based on the peaks extracted from the results of the second Fourier transform, (STEP S40), and calculates a maximum of three horizontal angles based on the peaks extracted from the results of the third Fourier transform (STEP S40). As the azimuth calculation process, besides DBF, other well-known azimuth calculation processes such as Capon, LP (Linear Prediction), MUSIC (MUltiple SIgnal Classification), and ESPRIT (Estimation of Signal Parameters via Rotational Invariance Technique) may be used. The reason is that the signal processing device 4 does not vertically perform Fourier transform after horizontally performing the Fourier transform.

Next, the vector decomposition unit 47 performs vector decomposition with respect to the vertical antenna arrangement positions V1 to V3 of the antenna group shown in FIG. 2, using the horizontal angles which are the results of the azimuth calculation of the first azimuth calculation unit 46 (STEP S50).

In the present embodiment, a mode vector reference is determined for each of the vertical antenna arrangement positions V1 to V3 of the antenna group shown in FIG. 2. For this reason, the antenna arrangement positions of the antenna group are not limited to a rectangular lattice along the horizontal direction and the vertical direction, and the degree of freedom for antenna arrangement is high. Therefore, in the present invention, the antenna group shown in FIG. 2 is used. Also, a mode vector is a vector in which ideal signals of the individual channels for a signal having an amplitude of 1 received from a certain angle are arranged.

Also, in the present embodiment, the horizontal antenna arrangement position H1 of the receiving antenna 32_1 is set as a mode vector reference. However, the horizontal antenna arrangement position of a receiving antenna other than the receiving antenna 32_1 may be set as a mode vector reference. If a horizontal antenna arrangement position is set as a mode vector reference, setting of a mode vector reference is easy.

The vector decomposition unit 47 performs vector decomposition with respect to the vertical antenna arrangement position V1 of the antenna group shown in FIG. 2. Also, in the case where the number of antennas for vector decomposition is larger than the number of horizontal angles, a vector perpendicular to a mode vector may be obtained, for example, a propagator method, before vector decomposition.

First, the vector decomposition unit 47 defines the following.

$$A = (a1(\theta 1), \ldots, a1(\theta m))$$

Here, a mode vector $a1(\theta)$ related to the receiving antennas 32_1 to 32_4 may be expressed as follows. Also, $\lambda$ represents the wavelength of a signal.

$$a1(\theta) = \begin{pmatrix} \exp\left(-j\left(\frac{2\pi}{\lambda}\right)(0)d * \sin(\theta)\right) \\ \exp\left(-j\left(\frac{2\pi}{\lambda}\right)(1)d * \sin(\theta)\right) \\ \exp\left(-j\left(\frac{2\pi}{\lambda}\right)(2)d * \sin(\theta)\right) \\ \exp\left(-j\left(\frac{2\pi}{\lambda}\right)(3)d * \sin(\theta)\right) \end{pmatrix} \quad \text{[Expression 1]}$$

The vector decomposition unit 47 divides the above-mentioned A into two, i.e. A1 and A2. Here, A1 represents a matrix composed of the 1st to m-th columns of the 1st to m-th rows of A. A2 represents a matrix composed of the 1st to m-th columns of the (m+1)-th to (m+4)-th rows of A.

Next, the vector decomposition unit calculates the following P.

$$P = \begin{pmatrix} (A2 \times A1^{-1})^H \\ -I \end{pmatrix} \quad \text{[Expression 2]}$$

Here, the superscript H represents Hermitian transpose (transpose of the conjugates of the entries), and I represents the identity matrix of size (4−m).

Subsequently, with respect to each column vector of P, the vector decomposition unit performs the following calculation. Also, in the following calculation formula, Pt represents a column vector of P.

Calculation Formula: $\text{sqrt}4 \times Pt/|Pt|$

Next, with respect to P subjected to the above-mentioned calculation, the vector decomposition unit determines the following square matrix of size 4 by concatenating A and P.

$$B = (A P)$$

Subsequently, the vector decomposition unit calculates the following Expression, using a column vector in which the beat signals corresponding to the receiving antennas 32_1 to 32_4 are arranged.

$$Y = B^{-1} \times X$$

The column vector Y is a vector in which a signal Y11 a signal Y21, and a signal Y31 are arranged.

Also, the vector decomposition unit 47 defines the following.

$$A=(a2(\theta 1), \ldots, a2(\theta m))$$

Subsequently, the vector decomposition unit calculates the following Expression, using a column vector in which the beat signals corresponding to the receiving antennas 32_5 to 32_8 are arranged.

$$Y=B^{-1}\times X$$

In this case, the column vector Y is a vector in which a signal Y12, a signal Y22, and a signal Y32 are arranged. Here, a mode vector $a2(\theta)$ related to the receiving antennas 32_5 to 32_8 may be expressed as follows.

$$a2(\theta) = \begin{pmatrix} \exp\left(-j\left(\frac{2\pi}{\lambda}\right)(0.5)d*\sin(\theta)\right) \\ \exp\left(-j\left(\frac{2\pi}{\lambda}\right)(1.5)d*\sin(\theta)\right) \\ \exp\left(-j\left(\frac{2\pi}{\lambda}\right)(2.5)d*\sin(\theta)\right) \\ \exp\left(-j\left(\frac{2\pi}{\lambda}\right)(3.5)d*\sin(\theta)\right) \end{pmatrix} \quad \text{[Expression 3]}$$

Also, the vector decomposition unit 47 defines the following.

$$A=(a3(\theta 1), \ldots, a3(\theta m))$$

Subsequently, the vector decomposition unit calculates the following Expression, using a column vector in which the beat signals corresponding to the receiving antennas 32_9 to 32_12 are arranged.

$$Y=B^{-1}\times X$$

In this case, the column vector Y is a vector in which a signal Y13, a signal Y23, and a signal Y33 are arranged. Here, a mode vector $a3(\theta)$ related to the receiving antennas 32_9 to 32_12 can be expressed as follows.

$$a3(\theta) = \begin{pmatrix} \exp\left(-j\left(\frac{2\pi}{\lambda}\right)(1)d*\sin(\theta)\right) \\ \exp\left(-j\left(\frac{2\pi}{\lambda}\right)(2)d*\sin(\theta)\right) \\ \exp\left(-j\left(\frac{2\pi}{\lambda}\right)(3)d*\sin(\theta)\right) \\ \exp\left(-j\left(\frac{2\pi}{\lambda}\right)(4)d*\sin(\theta)\right) \end{pmatrix} \quad \text{[Expression 4]}$$

Figures 4, 5:
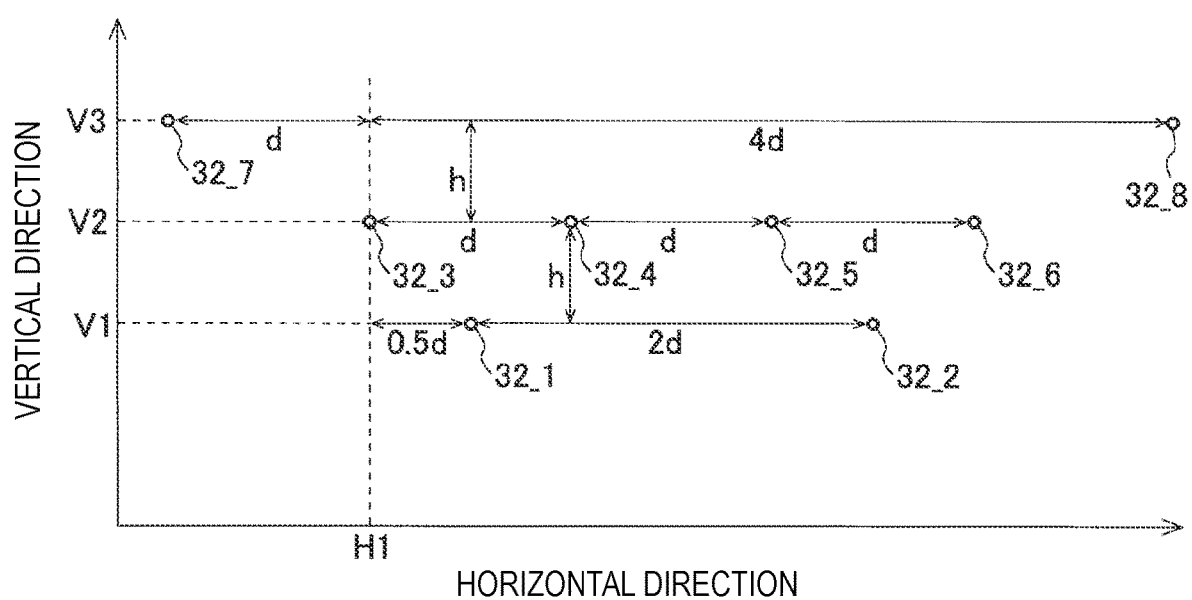
FIG. 4 is a view illustrating results of vector decomposition.
FIG. 5 is a view illustrating a modification of the antenna arrangement of the antenna group.

As described above, the vector decomposition unit 47 calculates the signal Y11 corresponding to the receiving antennas 32_1 to 32_4 and the horizontal angle θ1, and calculates the signal Y21 corresponding to the receiving antennas 32_1 to 32_4 and the horizontal angle θ2, and classifies the signal Y31 corresponding to the receiving antennas 32_1 to 32_4 and the horizontal angle θ3, as the results of the vector decomposition (see FIG. 4).

Similarly, the vector decomposition unit 47 calculates the signal Y12 corresponding to the receiving antennas 32_5 to 32_8 and the horizontal angle θ1, and calculates the signal Y22 corresponding to the receiving antennas 32_5 to 32_8 and the horizontal angle θ2, and classifies the signal Y32 corresponding to the receiving antennas 32_5 to 32_8 and the horizontal angle θ3, as the results of the vector decomposition (see FIG. 4).

Also, similarly, the vector decomposition unit 47 calculates the signal Y13 corresponding to the receiving antennas 32_9 to 32_12 and the horizontal angle θ1, and calculates the signal Y23 corresponding to the receiving antennas 32_9 to 32_12 and the horizontal angle θ2, and classifies the signal Y33 corresponding to the receiving antennas 32_9 to 32_12 and the horizontal angle θ3, as the results of the vector decomposition (see FIG. 4).

If the vector decomposition process of STEP S50 finishes, the second azimuth calculation unit 48 calculates vertical angles, using the results of the vector decomposition of the vector decomposition unit 47 (STEP S60). Specifically, the second azimuth calculation unit 48 calculates a maximum of two vertical angles based on the signal Y11, the signal Y12, and the signal Y13 by an azimuth calculation process. Similarly, by the azimuth calculation process, the second azimuth calculation unit 48 calculates a maximum of two vertical angles based on the signal Y21, the signal Y22, and the signal Y23, and calculates a maximum of two vertical angles based on the signal Y31, the signal Y32, and the signal Y33. As the azimuth calculation process, besides DBF, other well-known azimuth calculation processes such as Capon, LP, MUSIC, and ESPRIT may be used. If the azimuth calculation process of STEP S60 finishes, the flow operation shown in FIG. 3 ends.

Since each of the azimuth calculation process of STEP S40 and the azimuth calculation process of STEP S60 is not limited to DBF, the radar device 1 has a high degree of freedom for azimuth calculation algorithms. Therefore, in the radar device 1, it is possible to use an azimuth calculation algorithm, such as ESPRIT, having separation performance higher than that of DBF.

Now, detection of a first target existing in the direction having a horizontal angle of 0 degrees and a vertical angle of 0 degrees, a second target existing in the direction having a horizontal angle of 10 degrees and a vertical angle of 0 degrees, and a third target existing in the direction having a horizontal angle of 0 degrees and a vertical angle of 10 degrees is considered. For example, in the case where the radar device 1 uses ESPRIT in each of the azimuth calculation process of STEP S40 and the azimuth calculation process of STEP S60, it is possible to separately detect the accurate angles of the first target, the second target, and the third target. In contrast, in the case of calculating the horizontal angles and vertical angles of the targets by performing two-dimensional FFT which is a technology of the related art, in the frequency spectrum, only one peak occurs at the position having a horizontal angle of 5.4 degrees and a vertical angle of 5.4 degrees. For this reason, it is impossible to separately detect the first target, the second target, and the third target.

Also, the number of process steps which the radar device 1 needs to perform in order to calculate the horizontal angles and vertical angles of the targets is 7212; whereas in order to the horizontal angles and vertical angles of the targets by performing two-dimensional FFT which is a technology of the related art, the number of process steps which are required is 87552. In other words, the radar device 1 may significantly reduce the processing load as compared to the technology of the related art.

<1-3. Modifications>

Unlike the present embodiment, the Fourier transform unit 43 may perform vertical Fourier transform, and the first azimuth calculation unit 46 may calculate the vertical angles, and the vector decomposition unit 47 may perform vector decomposition with respect to each of the horizontal antenna arrangement positions of the antenna group shown in FIG. 2, using the vertical angles which are the results of the azimuth calculation of the first azimuth calculation unit 46, and the second azimuth calculation unit 48 may calculate the horizontal angles, using the results of the vector decomposition of the vector decomposition unit 47.

Also, instead of the antenna group shown in FIG. 2, for example, an antenna group shown in FIG. 5 may be used. In the case of using the antenna group shown in FIG. 5, if the horizontal antenna arrangement position H1 of the receiving antenna 32_3 is set as a mode vector reference, mode vectors a4 to a6 to be used in vector decomposition may be expressed as follow. Also, the mode vector a4 is a mode vector related to the receiving antennas 321 and 32_2 of the antenna group shown in FIG. 5. The mode vector a5 is a mode vector related to the receiving antennas 32_3 to 32_6 of the antenna group shown in FIG. 5. The mode vector a6 is a mode vector related to the receiving antennas 32_7 to 32_8 of the antenna group shown in FIG. 5.

$$a4(\theta) = \begin{pmatrix} \exp\left(-j\left(\frac{2\pi}{\lambda}\right)(0.5)d*\sin(\theta)\right) \\ \exp\left(-j\left(\frac{2\pi}{\lambda}\right)(2.5)d*\sin(\theta)\right) \end{pmatrix}$$ [Expression 5]

$$a5(\theta) = \begin{pmatrix} \exp\left(-j\left(\frac{2\pi}{\lambda}\right)(0)d*\sin(\theta)\right) \\ \exp\left(-j\left(\frac{2\pi}{\lambda}\right)(1)d*\sin(\theta)\right) \\ \exp\left(-j\left(\frac{2\pi}{\lambda}\right)(2)d*\sin(\theta)\right) \\ \exp\left(-j\left(\frac{2\pi}{\lambda}\right)(3)d*\sin(\theta)\right) \end{pmatrix}$$

$$a6(\theta) = \begin{pmatrix} \exp\left(-j\left(\frac{2\pi}{\lambda}\right)(-1)d*\sin(\theta)\right) \\ \exp\left(-j\left(\frac{2\pi}{\lambda}\right)(4)d*\sin(\theta)\right) \end{pmatrix}$$

Figure 6:
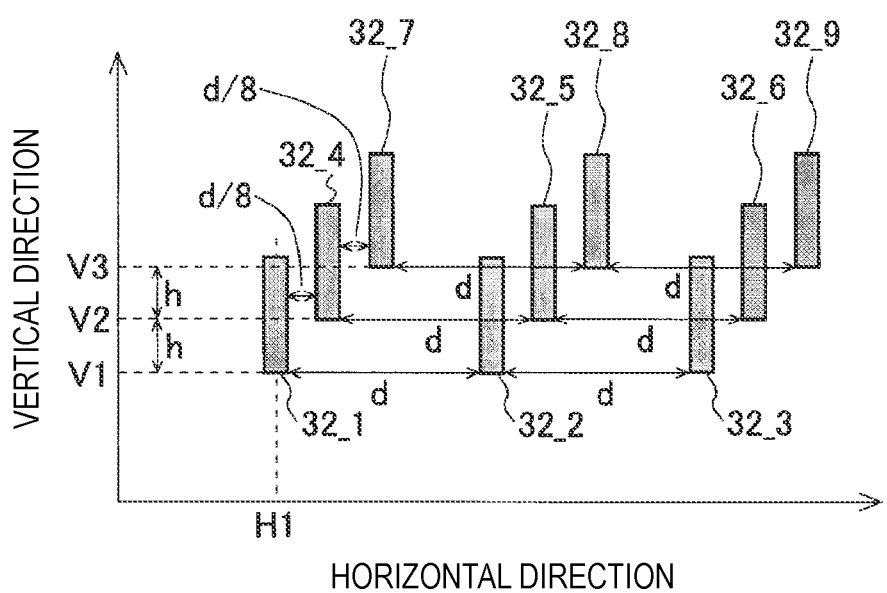
FIG. 6 is a view illustrating another modification of the antenna arrangement of the antenna group.

Also, instead of the antenna group shown in FIG. 2, for example, an antenna group shown in FIG. 6 may be used. The antenna group shown in FIG. 6 is formed by receiving antennas 32_1 to 32_9 having a vertical aperture length larger than a horizontal aperture length. If the receiving antennas 32_1 to 32_9 having the vertical aperture length larger than the horizontal aperture length are used, it is possible to make the vertical-angle separation performance higher than the horizontal-angle separation performance. Therefore, it is possible to improve, for example, the accuracy of discrimination between road signs which are upper objects which cannot become obstacles to the vehicle and preceding vehicles, pedestrians, and so on which may become obstacles to the vehicle.

2. Second Embodiment

<2-1. Configuration of Radar Device>

Figure 7:
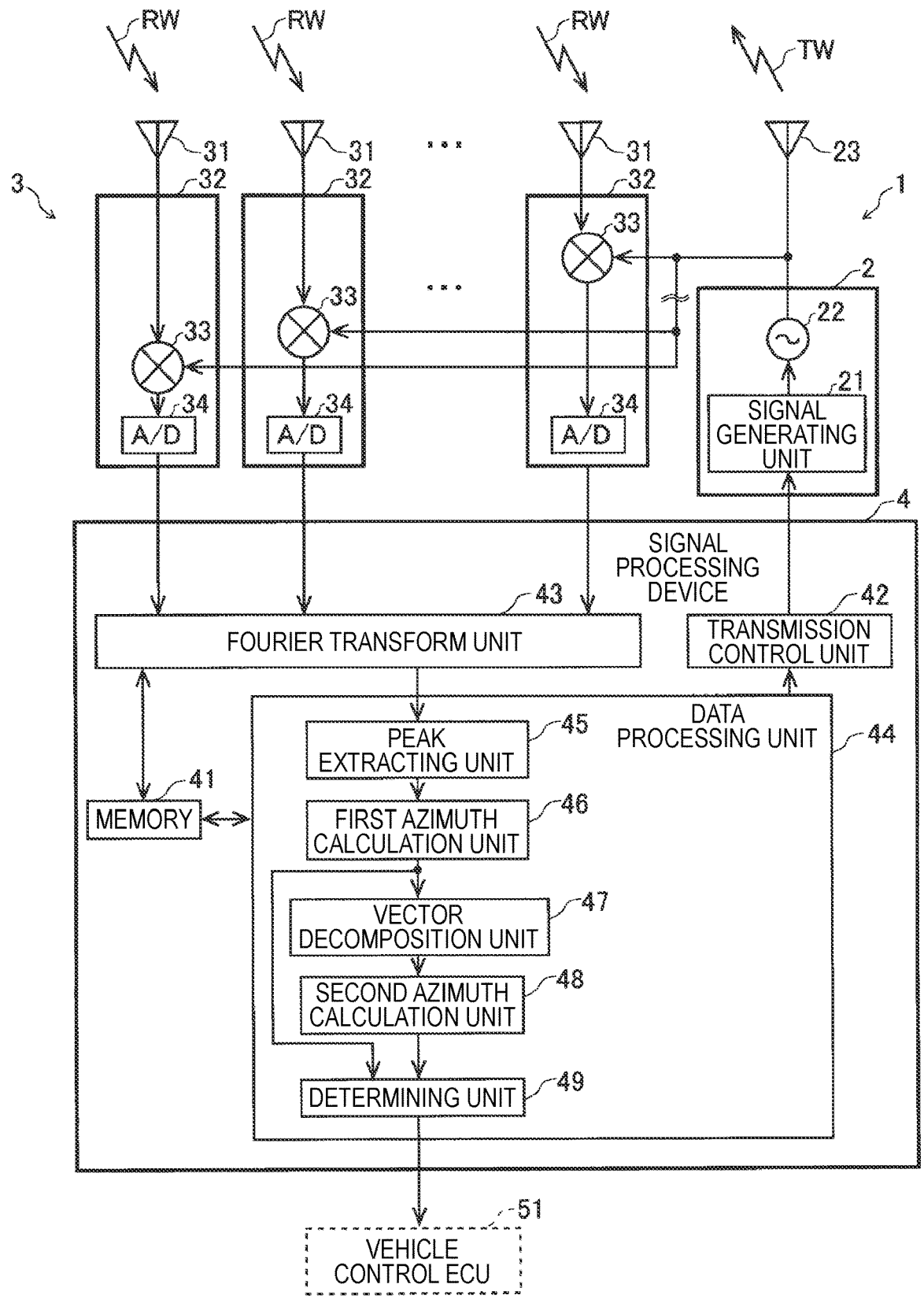
FIG. 7 is a view illustrating an example of the configuration of a radar device according to a second embodiment.

FIG. 7 is a view illustrating the configuration of a radar device 1 according to the second embodiment.

A radar device 1 according to the second embodiment shown in FIG. 7 is different from the radar device 1 according to the first embodiment shown in FIG. 1 in that the data processing unit 44 includes a determining unit 49. The determining unit 49 determines an azimuth to be used, from azimuth candidates including the results of the azimuth calculation of the first azimuth calculation unit 46 and the replication of phase thereof, on the basis of the results of the azimuth calculation of the second azimuth calculation unit 48.

Also, the radar device 1 according to the present embodiment shown in FIG. 7 is different from the radar device 1 according to the first embodiment shown in FIG. 1 in that the first azimuth calculation unit 46 outputs the vertical angles to the determining unit 49, not to the vehicle control ECU 51.

Figure 8:
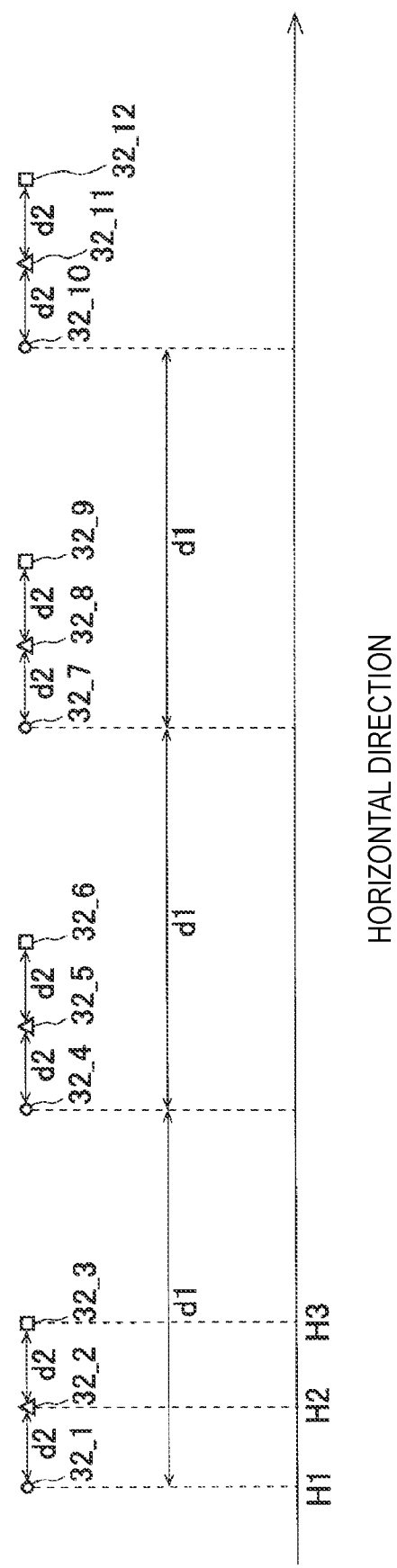
FIG. 8 is a view illustrating the antenna arrangement of an antenna group according to the second embodiment.

Further, the radar device 1 according to the present embodiment shown in FIG. 7 is different from the radar device 1 according to the radar device 1 shown in FIG. 1 in that plural receiving antennas 31 are nine receiving antennas 31_1 to 31_9 and form an antenna group having an antenna arrangement shown in FIG. 8.

In the antenna arrangement shown in FIG. 8, the receiving antenna 31_1, the receiving antenna 31_4, the receiving antenna 31_7, and the receiving antenna 31_10 are arranged in the horizontal direction at antenna intervals of d1 meters. Similarly, the receiving antenna 31_2, the receiving antenna 31_5, the receiving antenna 31_8, and the receiving antenna 3111 are arranged in the horizontal direction at antenna intervals of d1 meters. Similarly, the receiving antenna 31_3, the receiving antenna 31_6, the receiving antenna 31_9, and the receiving antenna 31_12 are arranged in the horizontal direction at antenna intervals of d1 meters. Further, the receiving antennas 32_1 to 32_3 are arranged in the horizontal direction at antenna intervals of d2 meters. Similarly, the receiving antennas 32_4 to 32_6 are arranged in the horizontal direction at antenna intervals of d2 meters. Similarly, the receiving antennas 32_7 to 32_9 are arranged in the horizontal direction at antenna intervals of d2 meters. Similarly, the receiving antennas 32_10 to 32_12 are arranged in the horizontal direction at antenna intervals of d2 meters. The antenna interval of d2 meters is shorter than the antenna interval of d1 meters. Also, the value of the antenna interval 2 d (meters) is set such that in the case of calculating the horizontal angles of targets using signals received by the receiving antennas arranged at intervals of 2 d meters, replication of phase is prevented from occurring in the output in the effective output range of the radar device 1 related to the horizontal angles of the targets.

Except for the above-mentioned three points, the radar device 1 according to the present embodiment shown in FIG. 7 basically has the same configuration as that of the radar device 1 according to the first embodiment shown in FIG. 1.

<2-2. Operation of Signal Processing Device>

Figure 9:
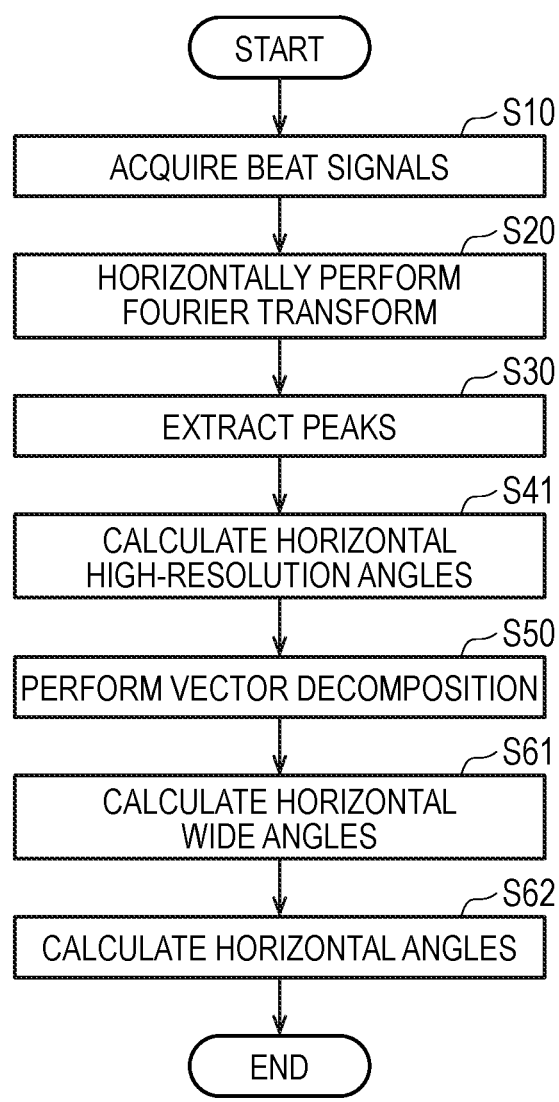
FIG. 9 is a flow chart illustrating an operation of a signal processing device according to the second embodiment.

Now, the operation of the signal processing device 4 according to the present embodiment will be described. FIG. 9 is a flow chart illustrating the operation of the signal processing device 4. The signal processing device 4 periodically repeats the process shown in FIG. 9 at intervals of a predetermined time.

The signal processing device 4 acquires a predetermined number of beat signals (STEP S10). Next, the Fourier transform unit 43 horizontally performs first Fourier transform on the beat signals corresponding to the receiving antennas 32_1, 32_4, 32_7, and 32_10 (STEP S20). Similarly, the Fourier transform unit 43 horizontally performs second Fourier transform on the beat signals corresponding to the receiving antennas 32_2, 32_5, 32_8, and 32_11 (STEP S20), and horizontally performs third Fourier transform on the beat signals corresponding to the receiving antennas 32_3, 32_6, 32_9, and 32_12 (STEP S20).

Next, the peak extracting unit 45 extracts peaks from the results of the first Fourier transform to the third Fourier transform (STEP S30).

Figure 10A:
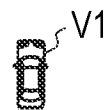
FIGS. 10A to 10C are views illustrating the horizontal angle of a target.

Next, the first azimuth calculation unit 46 calculates a maximum of three horizontal high-resolution angles based on the peaks extracted from the results of the first Fourier transform, by an azimuth calculation process (STEP S41). Similarly, by the azimuth calculation process, the first azimuth calculation unit 46 calculates a maximum of three horizontal high-resolution angles based on the peaks extracted from the results of the second Fourier transform, (STEP S41), and calculates a maximum of three horizontal high-resolution angles based on the peaks extracted from the results of the third Fourier transform (STEP S41). However, if the horizontal angles of targets are calculated using signals received by the receiving antennas arranged at intervals of d1 meters, replication of phase occurs in the effective output range of the radar device 1 related to the horizontal angles of targets. Now, the case where the radar device 1 and another vehicle V1 existing in front have the positional relation shown in FIG. 10A, and if the horizontal angles of targets are calculated using signals received by the receiving antennas arranged at intervals of d1 meters, replication of phase occurs in the effective output range of the radar device 1 related to the horizontal angles of targets occurs two times is considered.

Figure 10B:
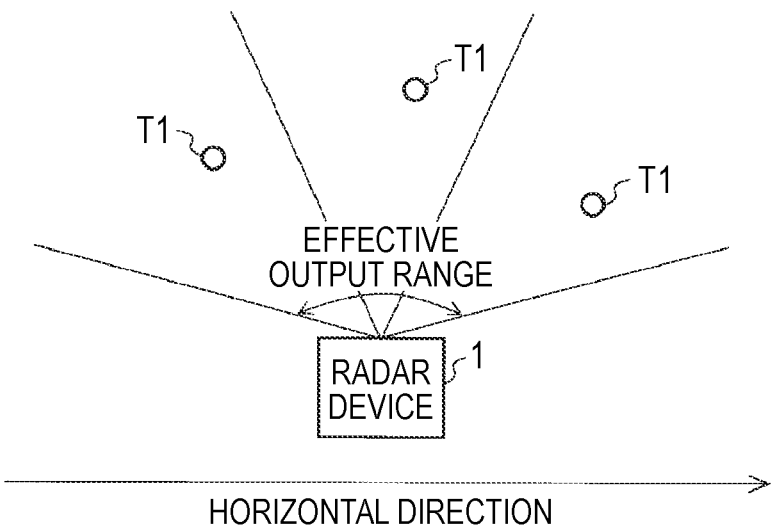

In this case, with respect to each of the horizontal high-resolution angles calculated in STEP S41, three azimuth candidates exist (see targets T1 in FIG. 10B).

Next, the vector decomposition unit 47 performs vector decomposition with respect to each of the antenna arrangement positions of the receiving antennas shown by circle marks in FIG. 8, the antenna arrangement positions of the receiving antennas shown by triangle marks in FIG. 8, and the antenna arrangement positions of the receiving antennas shown by square marks in FIG. 8 (STEP S50).

In the present embodiment, the horizontal antenna arrangement position H1 of the receiving antenna 32_1 is set as a mode vector reference for the antenna arrangement positions of the receiving antennas shown by the circle marks in FIG. 8, and the horizontal antenna arrangement position H2 of the receiving antenna 32_2 is set as a mode vector reference for the antenna arrangement positions of the receiving antennas shown by the triangle marks in FIG. 8, and the horizontal antenna arrangement position H3 of the receiving antenna 32_3 is set as a mode vector reference for the antenna arrangement positions of the receiving antennas shown by the square marks in FIG. 8. The details of the vector decomposition are the same as those of the first embodiment, so a description thereof will not be made.

Figure 10C:
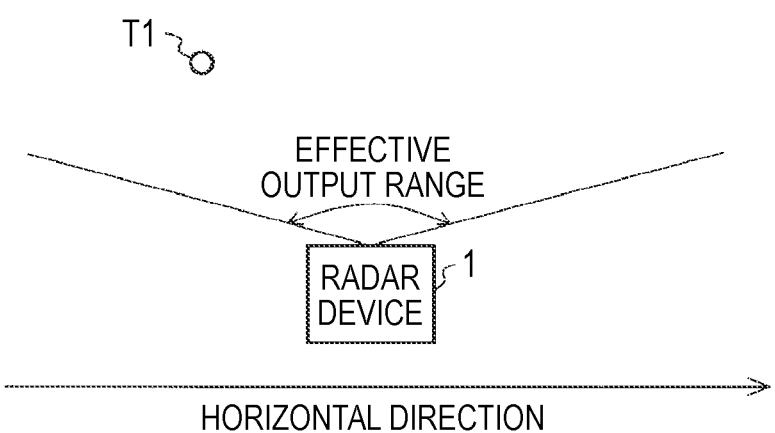

If the vector decomposition process of STEP S50 finishes, the second azimuth calculation unit 48 calculates the horizontal wide angles using the results of the vector decomposition of the vector decomposition unit 47 (STEP S61). Specifically, the second azimuth calculation unit 48 calculates a maximum of two horizontal wide angles based on the signal Y11, the signal Y12, and the signal Y13, by an azimuth calculation process. Similarly, by the azimuth calculation process, the second azimuth calculation unit 48 calculates a maximum of two horizontal wide angles based on the signal Y21, the signal Y22, and the signal Y23, and calculates a maximum of two horizontal wide angles based on the signal Y31, the signal Y32, and the signal Y33. However, since replication of phase does not occur in the horizontal wide angles, with respect to each of the horizontal wide angles calculated in STEP S61, plural azimuth candidates cannot exist (see a target T1 in FIG. 10C).

Next, with respect to each of the horizontal high-resolution angles calculated in STEP S41, the determining unit 49 uses an azimuth candidate having the smallest difference from a corresponding horizontal wide angle, from three azimuth candidates, as the horizontal angle of the corresponding target (STEP S62). If the use determination process of STEP S62 finishes, the flow operation shown in FIG. 9 ends.

Since each of the azimuth calculation process of STEP S41 and the azimuth calculation process of STEP S61 is not limited to DBF, the radar device 1 has a high degree of freedom for azimuth calculation algorithms. Therefore, in the radar device 1, it is possible to use an azimuth calculation algorithm, such as ESPRIT, having separation performance higher than that of DBF.

Also, with respect to each of the horizontal high-resolution angles calculated in STEP S41, three azimuth candidates exist; however, since it is possible to narrow them down to one azimuth calculation by the use determination process of STEP S62. Therefore, it is possible to solve the problem of replication of phase, and improve the accuracy of the horizontal angles of targets which are derived by the radar device 1.

<3. Others>

Various technical features disclosed in this specification may be modified variously without departing from the spirit of the technical invention besides the embodiments described above. Also, the plural embodiments and modifications disclosed in this specification may be combined within an acceptable range.

In the above-described first embodiment, the antenna group in which the plural receiving antennas are arranged in each of the horizontal direction and the vertical direction is used, and in the above-described second embodiment, the antenna group in which the plural receiving antennas are arranged in the vertical direction is used. However, the directions in which receiving antennas are arranged are not limited to the horizontal direction and the vertical direction, and it is only required to use an antenna group in which plural receiving antennas are arranged in each of a first axis direction and a second axis direction. Also, similarly in the first embodiment, the first axis direction and the second axis direction may be different directions, and similarly in the second embodiment, the first axis direction and the second axis direction may be the same direction.

For example, in the radar device, instead of the FCM system or the FM-CW system described above, for example, a pulse Doppler system for detecting a Doppler shift as phase variation between plural pulse signals, not as the frequency of a beat signal, and so on may be used.

In the above-described embodiments, the in-vehicle radar devices have been described. However, the present invention may also be applied to other devices, such as infrastructure radar devices which may be installed on the road and so on, and aircraft surveillance radars.

What is claimed is:

1. An azimuth calculation device comprising:
    an antenna group including a plurality of receiving antennas that are arranged in each of a first axis direction and a second axis direction; and
    at least one processor configured to:
        acquire signals of the plurality of receiving antennas of the antenna group based on reception signals received by the antenna group;

perform a first calculation of a direction of arrival of radio wave in the first axis direction based on the acquired signals of the plurality of receiving antennas;

perform vector decomposition with respect to each of antenna arrangement positions in the second axis direction using a result of the first calculation, the antenna arrangement positions being positions at which the plurality of receiving antennas of the antenna group are arranged; and perform a second calculation of a direction of arrival of radio wave in the second axis direction, using a result of the vector decomposition.

2. The azimuth calculation device according to claim 1, wherein the at least one processor is configured to set a mode vector reference for each of the antenna arrangement positions in the second axis direction.

3. The azimuth calculation device according to claim 2, wherein the at least one processor is configured to set, as the mode vector reference, an antenna arrangement position of a predetermined antenna of the antenna group in the first axis direction.

4. The azimuth calculation device according to claim 3, wherein one of the first axis direction and the second axis direction is a horizontal direction, and other of the first axis direction and the second axis direction is a vertical direction, and aperture lengths of the plurality of receiving antennas in the vertical direction are larger than aperture lengths of the plurality of receiving antennas in the horizontal direction.

5. The azimuth calculation device according to claim 2, wherein one of the first axis direction and the second axis direction is a horizontal direction, and other of the first axis direction and the second axis direction is a vertical direction, and aperture lengths of the plurality of receiving antennas in the vertical direction are larger than aperture lengths of the plurality of receiving antennas in the horizontal direction.

6. The azimuth calculation device according to claim 1, wherein one of the first axis direction and the second axis direction is a horizontal direction, and other of the first axis direction and the second axis direction is a vertical direction, and aperture lengths of the plurality of receiving antennas in the vertical direction are larger than aperture lengths of the plurality of receiving antennas in the horizontal direction.

7. The azimuth calculation device according to claim 1, wherein the first axis direction and the second axis direction are a same direction, and the at least one processor is configured to determine an azimuth to be used, from azimuth candidates including the result of the first calculation and replication of phase of the result of the first calculation, based on the result of the second calculation.

8. An azimuth calculation method comprising:

acquiring signals of a plurality of receiving antennas of an antenna group in which the plurality of receiving antennas are arranged in each of a first axis direction and a second axis direction, based on reception signals received by the antenna group;

calculating a direction of arrival of radio wave in the first axis direction based on the signals of the plurality of receiving antennas acquired;

performing vector decomposition with respect to each of antenna arrangement positions in the second axis direction using a result of the calculating of the direction of arrival of radio wave in the first axis direction, the antenna arrangement positions being positions at which the plurality of receiving antennas of the antenna group are arranged; and calculating a direction of arrival of radio wave in the second axis direction, using a result of the vector decomposition.

* * * * *